(12) United States Patent
Amer

(10) Patent No.: US 7,415,112 B2
(45) Date of Patent: Aug. 19, 2008

(54) PARALLEL SCRAMBLER/DESCRAMBLER

(75) Inventor: Maher Amer, Nepean (CA)

(73) Assignee: Zarbana Digital Fund LLC, Wilmington, DE (US)

( * ) Notice: Subject to any disclaimer, the term of this patent is extended or adjusted under 35 U.S.C. 154(b) by 766 days.

(21) Appl. No.: 10/629,640

(22) Filed: Jul. 29, 2003

(65) Prior Publication Data

US 2004/0062397 A1 Apr. 1, 2004

Related U.S. Application Data

(60) Provisional application No. 60/411,343, filed on Sep. 18, 2002.

(51) Int. Cl.
*H04L 9/20* (2006.01)

(52) U.S. Cl. .................................... 380/268

(58) Field of Classification Search ................ None
See application file for complete search history.

(56) References Cited

U.S. PATENT DOCUMENTS

| | | | | |
|---|---|---|---|---|
| 3,784,743 | A | * | 1/1974 | Schroeder .................. 380/46 |
| 4,744,104 | A | * | 5/1988 | Pospischil .................. 380/44 |
| 4,807,290 | A | * | 2/1989 | Pospischil .................. 380/43 |
| 5,231,667 | A | * | 7/1993 | Kojima ..................... 380/28 |
| 5,241,602 | A | * | 8/1993 | Lee et al. .................. 380/268 |
| 5,267,316 | A | * | 11/1993 | Merino Gonzalez et al. .. 380/28 |
| 5,355,415 | A | * | 10/1994 | Lee et al. .................. 380/47 |
| 5,377,265 | A | * | 12/1994 | Wettengel et al. ........... 380/268 |
| 5,488,661 | A | * | 1/1996 | Matsui ..................... 380/29 |
| 5,530,959 | A | * | 6/1996 | Amrany .................... 380/268 |

(Continued)

FOREIGN PATENT DOCUMENTS

EP 0397079 A2 11/1990

(Continued)

OTHER PUBLICATIONS

Choi, D.W. "Parallel Scrambling Techniques for digital multiplexers." 1986. AT&T Technical Journal. vol. 65, No. 5. pp. 123-136.*

(Continued)

*Primary Examiner*—Christian La Forgia
(74) *Attorney, Agent, or Firm*—Stolowitz Ford Cowger LLP

(57) ABSTRACT

Systems, methods and devices for scrambling/descrambling sets of data bits using subsets of a recurring sequence of scrambler bits. A self-synchronous scrambler, regardless of the generating polynomial being implemented, will generate repeating sequences of scrambler bits regardless of the initial stage of the scrambler. To implement a parallel scrambler, given a current state of the scrambler, the next n states of the scrambler are predicted based on the current state of the scrambler. The scrambling operation can then be preformed using the values in the current state—parallel logic operations between preselected bits of the current state will yield the required values to be used in scrambling an incoming parallel data set. Once these required values are generated, a parallel logical operation between the required values and the incoming data set will result in the scrambled output data. The current state of the scrambler is then incremented by $n_{+1}$ by performing a predetermined set of logical operations between the various bits of the current state such that each bit of the $n_{+1}$ state is a result of a logical operation between selected and predetermined bits of the current state.

18 Claims, 2 Drawing Sheets

U.S. PATENT DOCUMENTS

| | | | |
|---|---|---|---|
| 5,844,989 A * | 12/1998 | Nishida et al. | 380/28 |
| 5,966,447 A * | 10/1999 | Nishida et al. | 380/28 |
| 5,978,486 A * | 11/1999 | Nishida et al. | 380/268 |
| 6,414,957 B1 * | 7/2002 | Kang et al. | 370/395.1 |
| 6,888,943 B1 * | 5/2005 | Lam et al. | 380/268 |
| 7,099,469 B2 * | 8/2006 | Kuhlman et al. | 380/28 |
| 7,106,859 B2 * | 9/2006 | Myszne | 380/30 |
| 7,133,432 B2 * | 11/2006 | Kuffner et al. | 375/137 |
| 2003/0145196 A1 * | 7/2003 | Heegard et al. | 713/150 |
| 2004/0025104 A1 * | 2/2004 | Amer | 714/759 |

FOREIGN PATENT DOCUMENTS

| | | | |
|---|---|---|---|
| EP | 0397079 A3 | 11/1990 | |
| EP | 0535357 A2 | 4/1993 | |
| EP | 0535357 A3 | 4/1993 | |

OTHER PUBLICATIONS

Seok Chang Kim et al. "Realizations of Parallel and Multibit-Parallel Shift Register Generators." Sep. 1997. IEEE Transactions on Communications vol. 45, No. 9. pp. 1053-1060.*

Seok Chang Kim et al. "Parallel Realizations of Distributed Sample Scramblers for Applications to Cell-Based ATM Transmission." Oct. 1997. IEEE Transactions on Communications, vol. 45, No. 10. p. 1245-1252.*

PCT International Search Report for International Application No. PCT/CA03/01132.

* cited by examiner

PARALLEL SCRAMBLER/DESCRAMBLER

RELATED APPLICATIONS

The present application claims priority on U.S. provisional application Ser. No. 60/411,343 filed Sep. 18, 2002.

FIELD OF THE INVENTION

The present invention relates to digital communications and is particularly applicable but not limited to scrambler/descrambler systems for use in wireless communications devices.

BACKGROUND TO THE INVENTION

The recent telecommunications revolution has led to an increased interest in wireless communications and, more specifically, to wireless applications in networking. This increased interest in wireless technology, coupled with the ever growing need for faster throughput speeds in networks, has put a premium on the radio electronics that are used to encode the data travelling between the different wireless nodes in a network. Part of every wireless device, be it a wireless telephone or a wireless transponder connected to a node in a wireless local area network (LAN), is a scrambler/descrambler device.

Scrambler/descrambler devices are quite well known and are currently in widespread use. They are used in wireless communications for not only security reasons but also for encoding the digital data to be transmitted. Internationally accepted design standards, such as the EEEE 802.11a standard for wireless communications, specify the polynomials to be used by compliant devices to help in standardizing wireless devices. However, the standards only provide a serial implementation of their scrambler/descrambler. Such an implementation is necessarily slow due to its serial nature.

Attempts have been made in the past to speed up the speed of such scrambler systems including increasing the clock speed of the circuit and using pseudo parallel methods. However, such attempts are fraught with drawbacks including increased power consumption, problems with thermal issues and synchronization issues.

Based on the above a truly parallel solution is required. Such a solution should not only provide the advantages of parallel circuits such as increased volume in output but should also provide easy scalability and adaptability to the differing implementations and standards.

It is therefore an object of the present invention to provide alternatives to the prior art which will, if not overcome, at least mitigate the drawbacks of the prior art.

SUMMARY OF THE INVENTION

The present invention relates to systems, methods and devices for scrambling/descrambling sets of data bits using subsets of a recurring sequence of scrambler bits. A self-synchronous scrambler, regardless of the generating polynomial being implemented, will generate repeating sequences of scrambler bits regardless of the initial stage of the scrambler. To implement a parallel scrambler, given a current state of the scrambler, the next n states of the scrambler are predicted based on the current state of the scrambler. The scrambling operation can then be performed using the values in the current state—parallel logic operations between preselected bits of the current state will yield the required values to be used in scrambling an incoming parallel data set. Once these required values are generated, a parallel logical operation between the required values and the incoming data set will result in the scrambled output data. The current state of the scrambler is then incremented by n+1 by performing a predetermined set of logical operations between the various bits of the current state such that each bit of the n+1 state is a result of a logical operation between selected and predetermined bits of the current state.

In a first aspect the present invention provides a system for processing a set of data bits using a subset of a recurring sequence of scrambler bits, the system comprising:
  receiving means for receiving said set of data bits;
  storage means for storing said set of data bits;
  digital logic means for determining an appropriate subset of said sequence of scramble bits;
  generating means for generating said appropriate subset; and
  digital operation means for performing a bitwise parallel digital operation between said appropriate subset and said set of data bits to produce an output set of data bits.

In a second aspect the present invention provides a digital scrambler/descrambler using a subset of a recurring sequence of scrambler bits, the scrambler/descrambler comprising:
  selection means for selecting between a first set of data bits to be scrambled and a second set of data bits to be descrambled;
  digital logic means for determining an appropriate subset of said sequence of scrambler bits, said appropriate subset being determined based on an immediately preceding subset of said sequence of scrambler bits;
  digital operation means for executing a bitwise parallel digital operation between said appropriate subset and either said first or said second set.

In a third aspect the present invention provides a method of processing a plurality of data bits using a subset of a recurring sequence of scrambler bits, the method comprising:
  a) receiving and storing in parallel said plurality of data bits;
  b) determining an appropriate subset of said sequence of scrambler bits based on an immediately preceding subset;
  c) generating said appropriate subset;
  d) loading said appropriate subset in a storage means; and
  e) performing a bitwise parallel XOR operation between said appropriate subset and said plurality of data bits.

BRIEF DESCRIPTION OF THE DRAWINGS

A better understanding of the invention will be obtained by considering the detailed description below, with reference to the following drawings in which.

DETAILED DESCRIPTION

Figure 1:
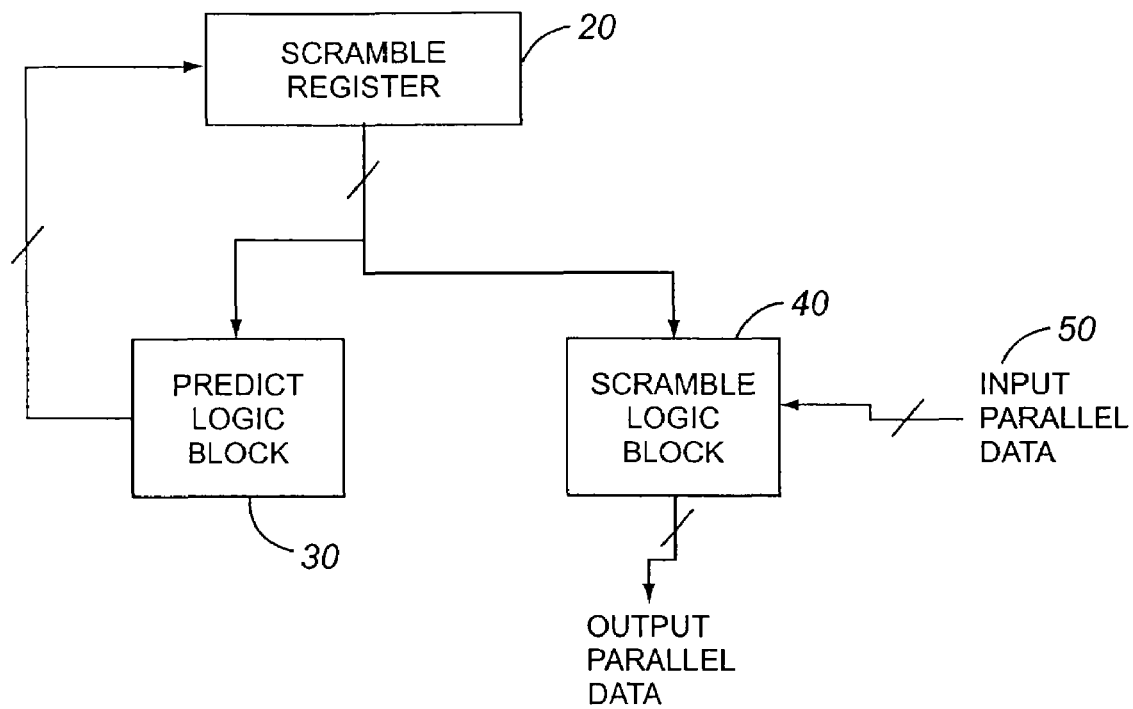
FIG. 1 is a block diagram of a system for parallel scrambling/descrambling of a parallel data set.

Referring to FIG. 1, a block diagram of a system for scrambling/descrambling data in parallel is illustrated. A storage means 20 contains a subset of a receiving sequence of scramble bits to be used in scrambling data in parallel. The contents of the storage means 20 is sent to both a predict logic block and a scramble logic block. Both these logic blocks 30, 40 are combinational circuits which perform operations using the contents of the storage means 20. The scramble logic block 40 also receives the input data 50 in parallel.

It should be noted that scrambling/descrambling operations, especially for self-synchronous scrambling/descrambling systems, are essentially sequential or serial in nature. The current state of the scrambler/descrambler determines its immediate future state. However, this very feature leads to scrambling/descrambling bit sequences that are periodic or that repeat every set number of iterations. The system for scrambling/descrambling data in parallel works by taking advantage of this periodic or recurring nature of most scrambling bit sequences. By treating the scrambling bit sequence as a counter whose status/state can be predicted based on the current values, the bits required for scrambling further input bits can be predicted and generated. As an example, if SCR $[0]_n$-SCR$[6]_n$ are taken as the bit states of bits 0 to 6 of a 7 bit scrambling sequence at iteration n, then these values are used in scrambling single bit input data IN$[0]_n$. For serial operation, SCR$[0]_{n+1}$-SCR$[6]_{n+1}$ are then used to scramble input data IN$[0]_{n+1}$ with SCR$[0]_{n+1}$- SCR$[6]_{n+1}$ being generated from SCR$[0]_n$ - SCR$[6]_n$ only.

The above serial operation can be parallelized by generating the bits required to scramble x input bits in parallel. Since the logical operation performed between the scrambling bits and the single input bits is known, parallel instances of the circuit for this logical operation may be implemented with each instance of the circuit receiving a different input bit and a different scrambling bit sequence. As noted above, the scrambling bit sequence is periodic and can be generated from the current state of the bit sequence. As such, generating in parallel the scrambling bit sequences n to n+x will allow parallel scambling of input bits n to n+x.

As an example of a generating polynomial for scrambling, the IEEE 802.11a specification (IEEE Std. 802.1b-1999) details a generating polynomial of $x^7+X^4+1$. This polynomial is taken to means that, for a 7 bit scrambling bit sequence, the $7^{th}$ bit is XOR'd with the $5^{th}$ bit and the incoming data bit to arrive at the output or scrambled bit. As noted in the standard, the polynomial will generate a repeating sequence when the all 1's initial state is used. This repeating sequence is the following:

00001110

11110010

11001001

00000010

00100110

00101110

10110110

00001100

11010100

11100111

10110100

00101010

11111010

01010001

10111000

11111111

Because the bit sequence being generated is recurring, the future states of the bit sequence can easily be generated by simply performing logical operations between the elements of the current bit sequence. This is illustrated below with reference to the polynomial used for the 802.11a standard.

For a given scrambling bit sequence of 7 bits, the following notation will be used:

x7=state of bit 6 x6=state of bit 5 x5=state of bit 4 x4=state of bit 3 x3=state of bit 2 x2=state of bit 1 x1=state of bit 0

Then using Out [n] being the nth output bit of the scrambler and IN[n] being the nth input bit, and assuming a generating polynomial of $x^7+x^4+1$, the output of the scrambler is given in terms of the bit sequence elements (N.B. $\oplus$ denotes an XOR operation):

Out[0]=x7$\oplus$x4$\oplus$In[0]

Out[1]=x6$\oplus$x3$\oplus$In[1]

Out[2]=x5$\oplus$x2$\oplus$In[2]

Out[3]=x4$\oplus$x1$\oplus$In[3]

Out[4]=x3$\oplus$x7$\oplus$x4$\oplus$In[4]

Out[5]=x2$\oplus$x6$\oplus$x3$\oplus$In[5]

Out[6]=x1$\oplus$x2$\oplus$x5$\oplus$In[6]

The above equations can therefore be generated in parallel to provide 7 output bits per cycle as opposed to the serial method which only produces a single output bit per cycle.

Once the 7 output bits have been generated, the scrambling bit sequence has to be incremented to the next state. Effectively, this step advances the bit sequence by 7 iterations if one were to think of the bit sequence is such that the next state of each element in the bit sequence can be expressed in terms of the current state of the bit sequence elements. Using the Nxt[n] as the nth bit of the next state of the bit sequence, the equations for the next state are as follows:

Nxt[0]=x1$\oplus$x2$\oplus$x5

Nxt[1]=x2$\oplus$x6$\oplus$x3

Nxt[2]=x3$\oplus$x7$\oplus$x4

Nxt[3]=x4$\oplus$x1

Nxt[4]=x5$\oplus$x2

Nxt[5]=x6$\oplus$x3

Nxt[6]=x7$\oplus$x4

Again, these equations can be implemented in parallel with each equation being implemented by a single combinational logic circuit. If one wished to reduce the number of logic gates in the combinational circuit, the equations used to predict and generate the next state of the bit sequence may be simplified as:

$$Nxt[0]=x1 \oplus Nxt[4]$$

$$Nxt[1]=x2 \oplus Nxt[5]$$

$$Nxt[2]=x3 \oplus Nxt[6]$$

$$Nxt[4]=x5 \oplus x2$$

$$Nxt[5]=x6 \oplus x3$$

$$Nxt[6]=x7 \oplus x4$$

Returning to FIG. 1, the predict logic block 30 implements the combinational circuit for generating the next state of the scrambling bit sequence while the storage means 20 9 in this case a register) stores the current state of the scrambling bit sequence. The scramble logic block 40 implements the combinational circuits for generating the output bits in parallel.

From an initial state of the scramble bit sequence, the scramble register 20 and the scramble logic block 40 use this initial state to scramble the incoming data in parallel. Once the output has been produced, this initial state is then fed into the predict logic block 30. The predict logic block then produces or generates the next incremental state of the scramble bit sequence and loads this new state into the scramble register 20. The process then begins anew with another set of input data being received in parallel by the scrambler logic block 40. This bitwise parallel scrambling and generation of the next state of the scramble bit sequence can provide much greater throughput than the usual serial scrambler implementation.

It should be noted that the circuit in FIG. 1 can be used for descrambling as well. Depending on the state of the scrambling bit sequence and on the input date, the output may be either scrambled or unscrambled data as the user desired.

Figure 2:
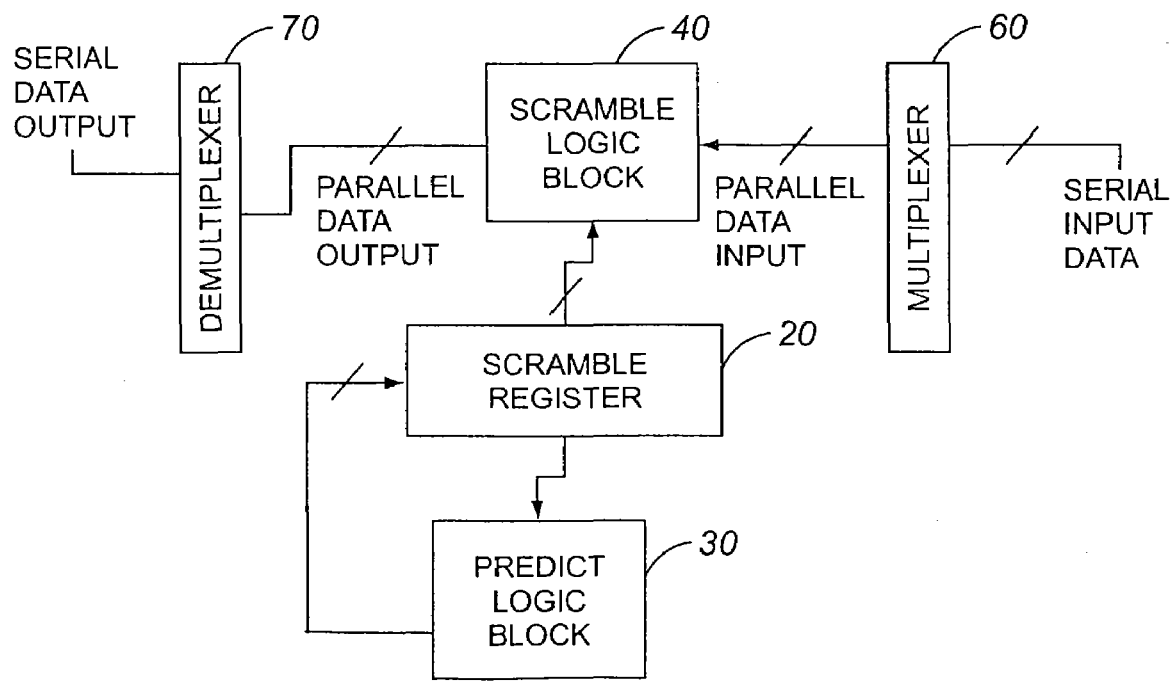
FIG. 2 is a block diagram of modification of the system of FIG. 1 modified to receive a serial data stream.

For a serial data input stream, the circuit of FIG. 1 can be adapted with the use of a multiplexer 60 and a demultiplexer 70. This configuration is illustrated in FIG. 2. The multiplexer 60 receives the serial data stream and multiplexes this data into a parallel set of data for the scramble logic block 40. The scramble logic block 40 then produces a parallel output data set to be received by the demultiplexer 70. The demultiplexer 70 then demultiplexes the data into a serial output data stream.

Figure 3:
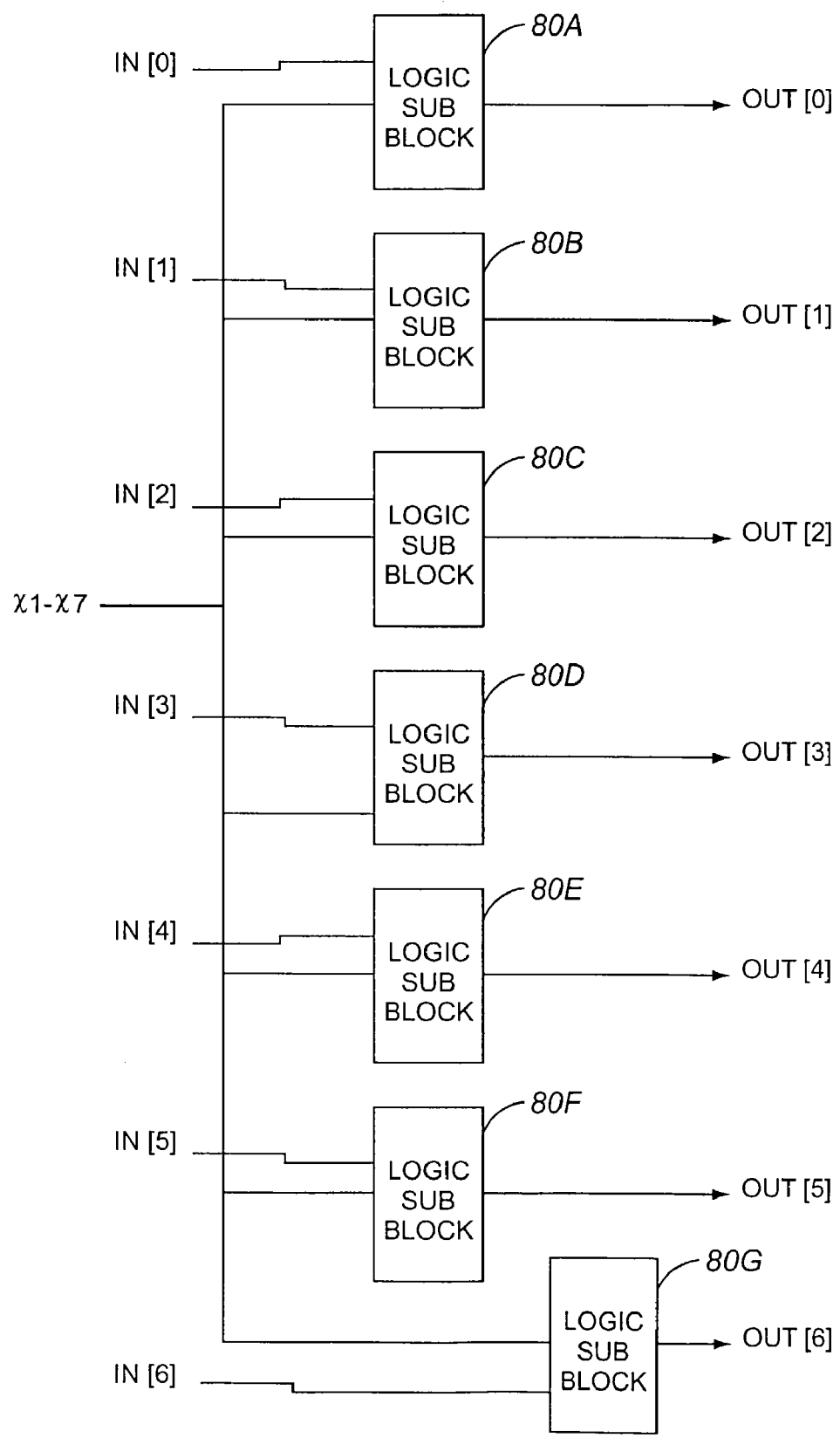
FIG. 3 is a block diagram of a sample implementation of a scramble logic block as used in FIGS. 1 and 2.

It should be noted that each logic block (scramble logic block 40 or predict logic block 30) can be implemented by using multiple parallel combinational logic sub-blocks. As can be seen in FIG. 3, logic sub-blocks 80A-80G each receive the scrambler bit sequence x1-x7 and each receives one of the input bits IN[0]-IN[6]. Each logical sub-block implements on combinational circuit that operates on the input data bit and the scrambler bit sequence to produce a single bit of the output data set. A similar set up can be used to implement the predict logic block 30 although, of course, such an implementation may not need the input data set IN[0]-IN[6].

It should be further be noted that while the above description and the attached diagrams illustrate and explain a 7 bit implementation, other bit widths may be used. Again using the generator polynomial $x^7+x^4+1$ of the 802.11a standard, a 6 bit implementation can be had by using equations similar to the above. For a 6 bit input and producing 6 bits of output, the equations are using the above notation:

$$OUT[0]=x7 \oplus x4 \oplus IN[0]$$

$$OUT[1]=x6 \oplus x3 \oplus IN[1]$$

$$OUT[2]=x5 \oplus x2 \oplus IN[2]$$

$$OUT[3]=x4 \oplus x1 \oplus IN[3]$$

$$OUT[4]=x3 \oplus x7 \oplus x4 \oplus IN[4]$$

$$OUT[5]=x2 \oplus x6 \oplus x3 \oplus IN[5]$$

To increment the scrambling bit sequence by 6 iterations (as opposed to the 7 iterations used above), the equations are as follows:

$$Nxt[0]=x2+x6+x3$$

$$Nxt[1]=x3+x3+x3$$

$$Nxt[2]=x4+x1$$

$$Nxt[3]=x5+x2$$

$$Nxt[4]=x6+x3$$

$$Nxt[5]=x7+x4$$

$$Nxt[6]=x1$$

A person understanding this invention may now conceive of alternative structures and embodiments or variations of the above all of which are intended to fall within the scope of the invention as defined in the claims that follow.

What is claimed is:

1. A system for processing a set of data bits comprising:
   storage means for storing a current state of a subset of a recurring serial sequence of scramble bits;
   digital logic means for determining the current state of the subset of the serial sequence of scramble bits by applying a generating polynomial to the serial sequence of scramble bits;
   generating means for generating a next state of the subset by logically manipulating at least one bit of the current state of the subset with at least another bit of the current state of the subset; and
   digital operation means for performing a bitwise parallel digital operation between each bit of the set of data bits with at least one corresponding bit of the current state of the subset to produce an output set of data bits;
   where the storage means is configured to replace the stored current state of the subset with the next state of the subset after the digital operation means performs the bitwise parallel digital operation.

2. The system according to claim 1 where the system is adapted to scramble the set of data bits using the current state of the subset.

3. The system according to claim 1 where the system is adapted to descramble the set of data bits using the current state of the subset.

4. The system according to claim 1 comprising receiving means including multiplexing means for receiving the serial sequence of scramble bits.

5. The system according to claim 1 where the digital logic means includes combinational logic means for logically manipulating the serial sequence of scramble bits.

6. The system according to claim 1 where the bitwise parallel operation includes a bitwise parallel XOR operation.

7. A digital scrambler/descrambler using a subset of a serial sequence of scrambler bits, the scrambler/descrambler comprising:
   selection means for selecting between a first set of data bits to be scrambled and a second set of data bits to be descrambled;
   digital logic means for determining a subset of the serial sequence of scrambler bits, the subset being determined by logically manipulating at least one bit of a preceding state of the subset with at least another bit of the preceding state of the subset;

digital operation means for executing a bitwise parallel digital operation between the subset and either the first or the second set of data bits;

where a number of bits in the subset corresponds to a periodicity of the serial sequence of scramble bits.

8. The digital scrambler/descrambler according to claim 7 where the bitwise parallel digital operation includes a bitwise parallel XOR operation.

9. The digital scrambler/descrambler according to claim 7 where the selection means includes a multiplexer.

10. The digital scrambler/descrambler according to claim 7 where the digital logic means includes a combinational logic circuit.

11. The digital scrambler/descrambler according to claim 10 where- the digital logic means includes a digital storage means for storing the immediately preceding subset.

12. A method of processing a plurality of data bits using a subset of a recurring serial sequence of scrambler bits, the method comprising:
 a) storing in parallel the plurality of data bits;
 b) determining a subset of the recurring serial sequence of scrambler bits by logically manipulating at least one bit of a preceding state of the subset with at least another bit of the preceding state of the subset;
 c) generating the subset where, for each bit of the plurality of data bits, at least one bit of the appropriate subset is associated therewith; and
 d) performing a bitwise parallel XOR operation between each bit of the plurality of data bits and the at least one bit of the subset associated therewith to produce an output set of data bits;
 where a number of bits in the subset corresponds to a periodicity of the recurring serial sequence of scramble bits.

13. The method according to claim 12 comprising performing logical operations between specific scrambler bits of the immediately preceding subset.

14. A The method according to claim 12 comprising loading the subset in a register.

15. A scrambler comprising:
 a register block to store a current state of a subset of a recurring serial sequence of scramble bits;
 a predict logic block to generate the current state of the subset by logically manipulating at least one bit of an immediately preceding state of the subset with at least another bit of the immediately preceding state of the subset; and
 a scramble logic block to scramble a data set in parallel with the current state of the subset;
 where the number of bits in the current state of the subset corresponds to a periodicity of the recurring serial sequence of scramble bits.

16. The scrambler of claim 15 comprising a multiplexer block to multiplex a serial version of the data set to create a parallel version of the data set.

17. The scrambler of claim 15 where the predict logic block or the scramble logic block includes a corresponding plurality of parallel combinational sub blocks.

18. The scrambler of claim 15 where the predict logic block is configured to determine the current state of the subset by applying a generator polynomial.

* * * * *

UNITED STATES PATENT AND TRADEMARK OFFICE
CERTIFICATE OF CORRECTION

| | | |
|---|---|---|
| PATENT NO. | : 7,415,112 B2 | Page 1 of 1 |
| APPLICATION NO. | : 10/629640 | |
| DATED | : August 19, 2009 | |
| INVENTOR(S) | : Maher Amer | |

It is certified that error appears in the above-identified patent and that said Letters Patent is hereby corrected as shown below:

At column 7, line 18, please delete "where-" and insert -- where --.

At column 8, line 7, please delete "A The" and insert -- The --.

Signed and Sealed this

Fourteenth Day of September, 2010

David J. Kappos
*Director of the United States Patent and Trademark Office*